United States Patent [19]
Girdwain

[11] Patent Number: 6,012,746
[45] Date of Patent: Jan. 11, 2000

[54] UNIVERSAL, SAND DISPERSION APPARATUS FOR MOTOR VEHICLES

[76] Inventor: Grace Girdwain, 8320 S. Nashville Ave., Burbank, Ill. 60459

[21] Appl. No.: 09/003,852

[22] Filed: Jan. 7, 1998

[51] Int. Cl.[7] .................................................. B60B 39/06
[52] U.S. Cl. .................................. 291/34; 291/25; 291/42
[58] Field of Search ..................... 291/25, 27, 34, 291/41, 42

[56] References Cited

U.S. PATENT DOCUMENTS

| | | | |
|---|---|---|---|
| D. 364,173 | 11/1995 | Woods | D12/172 |
| 1,501,650 | 7/1924 | Dienstbach et al. | 291/25 |
| 2,904,363 | 9/1959 | Michaletz | 291/19 |
| 2,999,711 | 9/1961 | Sturmer | 291/3 |
| 3,298,727 | 1/1967 | Picard | 291/3 |
| 4,036,516 | 7/1977 | Oldham | 291/38 |
| 4,036,577 | 7/1977 | Nettles | 291/25 |
| 4,575,135 | 3/1986 | Cervinka | 291/20 |
| 4,809,883 | 3/1989 | Pozo | 222/141 |
| 4,968,069 | 11/1990 | Jensen | 291/3 |
| 5,332,152 | 7/1994 | Alwaifie | 238/14 |

*Primary Examiner*—S. Joseph Morano

[57] ABSTRACT

An apparatus to improve traction conditions for motor vehicles under winter time driving conditions is disclosed. The invention comprises a sand storage reservoir and delivery system that supplies sand to each tire of a motor vehicle to aid in traction when driving in icy or snowy conditions found in wintertime driving. The sand reservoir provides sand to a plenum through four distinct sand compartments which dispense individual slugs of sand to a series of discs, connected via a cable, which move the sand through a delivery pipe to any of the four motor vehicle tires, as selected by application levers on the sand reservoir. The reservoir and associated controls are located inside the passenger compartment of the motor vehicle with the delivery tubes located on the undercarriage of the motor vehicle.

7 Claims, 4 Drawing Sheets

UNIVERSAL, SAND DISPERSION APPARATUS FOR MOTOR VEHICLES

RELATED APPLICATIONS

The present invention was first described in Disclosure Document Number 421,125 filed on Jun. 16, 1997. There have been no previously filed applications, nor any co-pending applications anywhere in the world.

BACKGROUND OF THE INVENTION

1. Field of the Invention

The present invention relates generally to motor vehicle driving aids and, more particularly, to a universal, sand dispersion apparatus for motor vehicles.

2. Description of the Related Art

In the related art, numerous attempts have been made to increase friction between the tires of a motor vehicle and icy or snowy road surfaces. These improvements have ranged from simple mats that placed under the motor vehicle tires to complex mechanical systems using hoppers, cables, heaters, pneumatic conveying systems and the like. A search of the prior art did not disclose any patents that read directly on the claims of the instant invention; however, the following references were considered related:

| U.S. Pat. No. | Inventor | Issue Date |
| --- | --- | --- |
| 5,332,152 | Mohammed Alwaifie | July 26, 1994 |
| 4,968,069 | Michael Jensen | Nov 6, 1990 |
| 4,809,883 | Jaime Pozo | Mar. 7, 1989 |
| 4,575,135 | Franz Cervinka | Mar. 11, 1986 |
| 4,556,243 | Franz Cervinka | Dec. 3, 1985 |
| 4,036,516 | Frank Oldham | July 19, 1977 |
| 2,999,711 | Leonard Sturmer | Sept. 12, 1961 |
| 2,904,363 | Martin Michaletz | Sept. 15, 1959 |
| D 364,173 | Wylie Woods | Nov. 14, 1995 |

The previous art consists of several devices in which sand or other friction increasing substance is applied to the tires of a motor vehicle to increase traction under icy or snowy road conditions. These devices, however, have one or more of the following problems.

First, the devices can be complex, and therefore, expensive to manufacture. The public is less likely to purchase an expensive universal, sand dispersion apparatus for motor vehicles.

Second, the use of such devices generally requires the use of an open sand hopper thus presenting the problems of spillage, caking, and clogging of the sand.

Third, many of the previous devices require the user to exit the vehicle to utilize said devices. This presents an inconvenience to the user as well as a possible safety hazard under wintertime driving conditions.

Fourth, many of the previous devices utilize delivery tubes or pipes that contain sand when not in use. This allows for possible long term retention of the sand that may allow clogging of said delivery tube or pipe especially when subjected to wintertime driving environments.

Fifth, many of the previous devices require the use of electrical power for use with heaters, vacuum systems, or air pressure generators thus requiring increased complexity and cost and interfacing to the electrical system of the motor vehicle.

Consequently, a need has therefore been felt for an improved but less complex mechanism that allows for a universal, sand dispersion apparatus for motor vehicles.

SUMMARY OF THE INVENTION

It is therefore an object of the present invention to provide an improved universal, sand dispersion apparatus for motor vehicles.

It is therefore another object of the present invention to provide for an improved universal, sand dispersion apparatus for motor vehicles that aids in the application of sand to the tire area of motor vehicles to aid in the improvement of traction under ice and snow conditions during wintertime driving.

It is yet another object of the present invention to allow a user to apply sand to the tire area of a motor vehicle without exiting the vehicle.

It is yet another object of the present invention to provide for an improved universal, sand dispersion apparatus for motor vehicles that allows for application of sand in a simple mechanical manner without the use of pneumatic, vacuum or electrical assistance.

It is yet another object of the present invention to allow the user to refill the sand reservoir from inside the motor vehicle passenger compartment using either prepackaged sand bags or bulk sand.

Briefly described according to the preferred embodiment of the present invention, the invention comprises a sand storage reservoir and delivery system that supplies sand to each tire of a motor vehicle to aid in traction when driving in icy or snowy conditions found in wintertime driving. The sand reservoir provides sand to a plenum through four distinct sand compartments which dispense individual slugs of sand to a series of discs, connected via a cable, which move the sand through a delivery pipe to any of the four motor vehicle tires, as selected by application levers on the sand reservoir. The reservoir and associated controls are located inside the passenger compartment of the motor vehicle with the delivery tubes located on the undercarriage of the motor vehicle.

An advantage of the present invention is that all components are located inside the passenger compartment of the motor vehicle or are located on the underside of said vehicle thus preserving the aesthetic qualities of the said motor vehicle.

Another advantage of the present invention is that it is simple, and therefore, inexpensive to manufacture. This savings, if passed on to the consumer, may influence the public to utilize such a device. A simple design also increases product reliability and useful product lifetime.

Another advantage of the present invention is that its integral mechanical nature permits relatively higher forces to be applied to the sand in lieu of vacuum or pneumatic pressure thus overcoming the potential of clogging or caking of said sand in the delivery tubes.

Another advantage of the present invention is that when it is utilized on ambulances, fire fighting apparatus, police cars and other emergency vehicles, it improves the overall effectiveness and response time of said emergency vehicles during wintertime driving conditions.

Another advantage of the present invention is that when it is utilized on school busses, disabled transport vehicles and the like, it improves the overall effectiveness and reliability of said vehicles.

Another advantage of the present invention is that the materials of construction, namely plastic and stainless steel, will not corrode in the highly corrosive environment found in wintertime driving.

Another advantage of the present invention is that it is easily produced from readily available materials using known manufacturing techniques, thus allowing for a practical, economical, and efficient product.

BRIEF DESCRIPTION OF THE DRAWINGS

The advantages and features of the present invention will become better understood with reference to the following more detailed description and claims taken in conjunction with the accompanying drawings, in which like elements are identified with like symbols, and in which:

DESCRIPTION OF THE PREFERRED EMBODIMENTS

The best mode for carrying out the invention is presented in terms of its preferred embodiment, herein depicted within the Figures.

1. Detailed Description of the Figures

Figure 1:
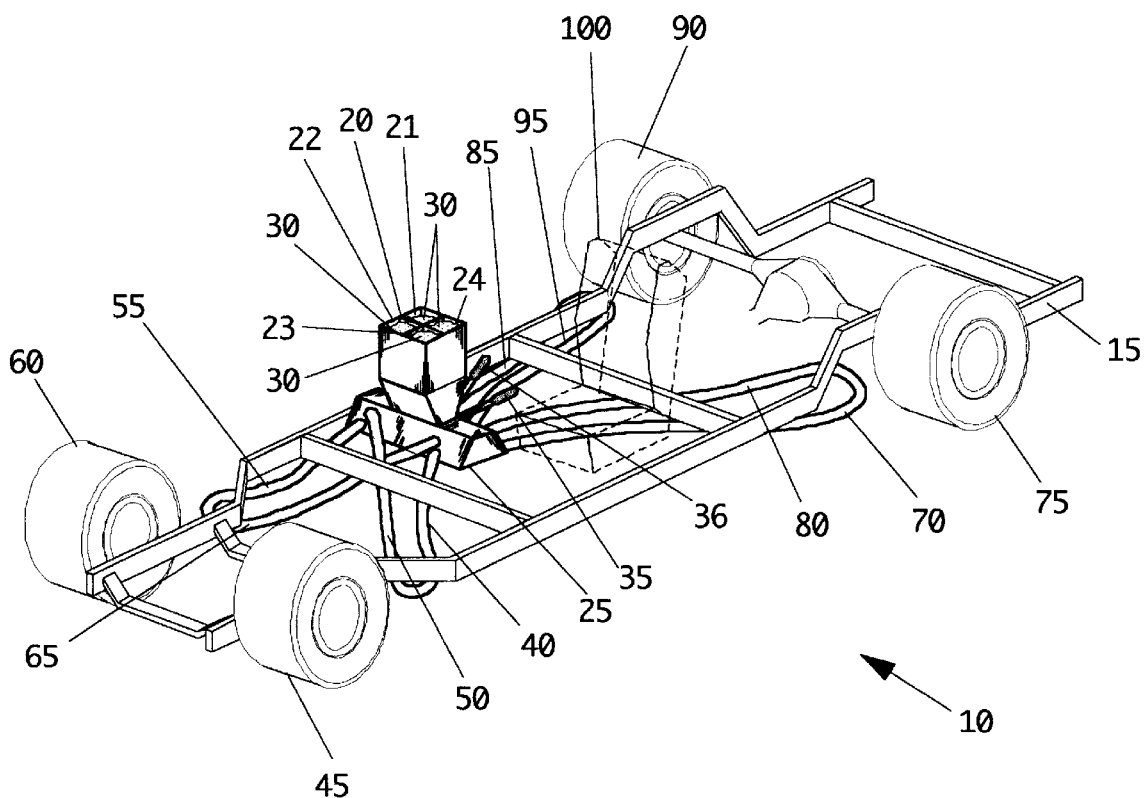
FIG. 1 is a perspective view of the universal, sand dispersion apparatus for motor vehicles shown on a typical motor vehicle in a cutaway state according to the preferred embodiment of the present invention.

Referring now to FIG. 1, a perspective view of a universal, sand dispersion apparatus for motor vehicles 10 is shown on a motor vehicle frame 15 in an installed state according to the preferred embodiment of the present invention. The motor vehicle frame 15 is typical of any desired motor vehicle such as, but not limited to, personal motor vehicles, industrial motor vehicles, tractor-trailer rigs, school busses, fire fighting apparatus, ambulances, emergency response vehicles, and the like. The exact placement of the individual components of the universal, sand dispersion apparatus for motor vehicles 10 will vary with the vehicle the universal, sand dispersion apparatus for motor vehicles 10 is installed upon, but will in general follow the arrangement as depicted in FIG. 1. A sand reservoir 20 is arranged substantially centrally in the passenger compartment area of the motor vehicle frame 15. The sand reservoir 20 consists of a first sand compartment 21, a second sand compartment 22, a third sand compartment 23, and a fourth sand compartment 24, whose function will be described in greater detail hereinbelow. The sand reservoir 20 is located directly on top of a sand distribution plenum 25. Sand 30 flows out of the bottom of the sand reservoir 20 and into the sand distribution plenum 25. Flow of the sand 30 out of the sand distribution plenum 25 is governed by a first operating lever 35 and a second operating lever 36, whose operation and function will be described in greater detail hereinbelow. A front left tire delivery tube 40 routes the sand 30 to a front left tire 45 and provides a return path via a front left tire return tube 50. A front right tire delivery tube 55 routes the sand 30 to a front right tire 60 and provides a return path via a front right tire return tube 65. A rear left tire delivery tube 70 routes the sand 30 to a rear left tire 75 and provides a return path via a rear left tire return tube 80. A rear right tire delivery tube 85 routes the sand 30 to a rear right tire 90 and provides a return path via a rear right tire return tube 95. The opening to the sand reservoir 20, as well as the first operating lever 35 and the second operating lever 36 are located as to be readily accessible to the driver's position within the motor vehicle as indicated by a driver's seat 100. The close proximity of the sand reservoir 20, the first operating lever 35, and the second operating lever 36 to the driver's seat 100 allow the driver to select either the front left tire 45, the front right tire 60, the rear left tire 75, or the rear right tire 90 as to receive sand dispersement as well as replenish sand 30 into the sand reservoir 20 under severe wintertime driving conditions where almost continuous dispersement of sand 30 is required. It is also envisioned that any caking or clogging of the sand 30 could be administered to and corrected from the driver's seat 100 as well, it is envisioned that all components would be manufactured from stainless steel, though it can be seen by those familiar in the art, that other materials equally resistant to corrosion, such as plastic and/or fiberglass could also be utilized.

Figure 2:
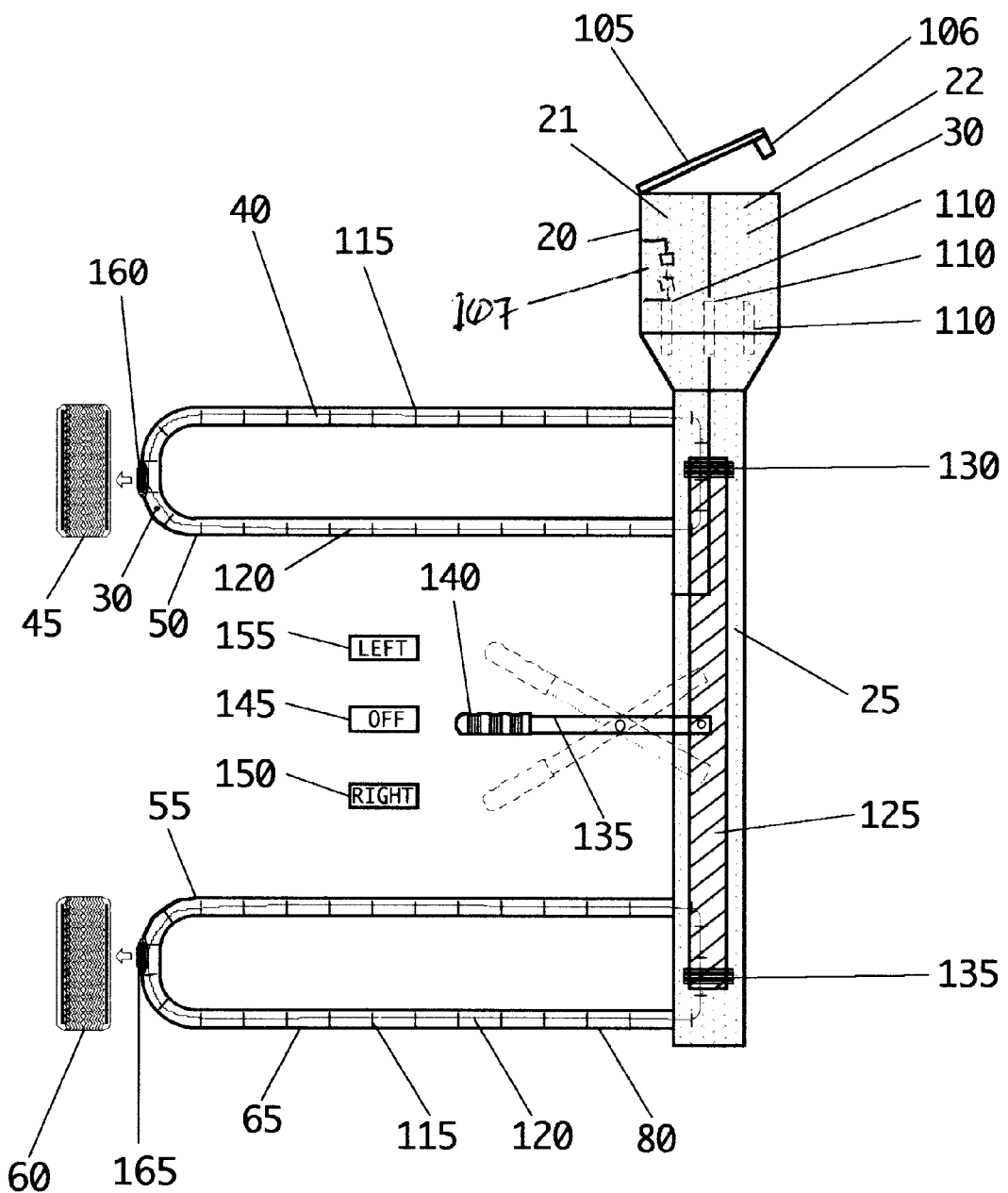
FIG. 2 is functional process flow diagram of the universal, sand dispersion apparatus for motor vehicles as provided for two of the four sand reservoirs.

Referring next to FIG. 2, a functional process flow diagram of the universal, sand dispersion apparatus for motor vehicles 10 is disclosed. This FIG. only depicts the first sand compartment 21 and the second sand compartment 22 side of the universal, sand dispersion apparatus for motor vehicles 10, however the third sand compartment 23 (not shown in this FIG.) and the fourth sand compartment 24 (not shown in this FIG.) with the second operating lever 36 portion would be identical in a symmetrical fashion. The sand reservoir 20 employs a reservoir cover 105 and a locking reservoir cover latch 106 to aid in the retention of the sand 30. It is also envisioned that the reservoir cover 105 and the locking reservoir cover latch 106 will provide protection for the first operating lever 35 and the second operating lever 36, to prevent inadvertent operation or accessing by small children that may be riding in the motor vehicle. A reservoir access orifice 107 is provided for alternate access to the sand reservoir 20. This will provide a maintenance access port in the case that a sand bag becomes lodged, or in any other instance where maintenance access is required by the operator. A plurality of breaker bars 110 (shown in phantom lines), located in the bottom of the sand reservoir 20, aid in the breaking of clumps in the sand 30 as well as breaking open prepackaged sand bags envisioned to be made available in two and four pound varieties. This option affords the user a cleaner filling process of the sand reservoir 20 than that when utilizing bulk sand. Also, the smaller size enables users who are restricted to lifting only limited weight, the ability to refill the sand reservoir 20 and use the universal, sand dispersion apparatus for motor vehicles 10. The sand distribution plenum 25 (shown in functional reference shape only) allows connection of the front left tire delivery tube 40, the front left tire return tube 50, the front right tire delivery tube 55, and the front right tire return tube 65. An identical system for the third sand compartment 23 (not shown in this FIG.) and the fourth sand compartment 24 (not shown in this FIG.) allow for the connection of the rear left tire delivery tube 70 (not shown in this FIG.), the rear left tire return tube 80 (not shown in this FIG.), the rear right tire delivery tube 85 (not shown in this FIG.) and the rear right tire 90. (not shown in this FIG.). Located inside each said delivery tube and return tube is a multitude of movable discs 115, connected by a connecting cable 120. An advancing means 125 such as a bar is supplied with a first ratcheting means 130 and a second ratcheting means 135. The first ratcheting means 130 and the second ratcheting means 135 grab the connecting cable 120 and advance the series of movable discs 115 through the sand 30 in a segment length as defined by the space interval between the movable discs 115. The position of the advancing means 125 is governed by the first operating lever 35, equipped with a padded grip 140. When the first operating lever 35 is located in an off position 145, both the first ratcheting means 130 and the second ratcheting means 135 are in a neutral position, and thus no movement of the movable discs 115 occurs. When the first operating lever 35 is moved into a right position 150, the first ratcheting means 130 will grab the next movable discs 115 in series, in the front right tire delivery tube 55, and when the first operating lever 35 is returned to the off position 145, the first ratcheting means 130 will pull the connecting cable 120 through, advancing the sand 30 through the right front system. When the first operating lever 35 is moved to a left position 155 and back to the off position 145, a similar sequence to the aforementioned will advance sand 30 through the left system. It is envisioned that by moving the first operating lever 35 from the right position 150 to the left position 155 and back again, will advance sand 30 through both the right and the left systems simultaneously and will result in increased traction to both wheels as would be found in the case of four-wheel drive vehicles or increased traction, steering and stability functions as would be found in the case of conventional two-wheel drive vehicles. A front left slotted application opening 160 is located at the transition from the front left tire delivery tube 40 to the front left tire return tube 50. Sand 30 located inside the front left tire delivery tube 40 will exit the front left tire delivery tube 40 through the front left slotted application opening 160 when the nearest movable discs 115 to the front left slotted application opening 160 passes over. The physical arrangement of the front left slotted application opening 160 and how it relates to the front left tire delivery tube 40 and the front left tire 45 will be described in greater detail below. Likewise a front right slotted application opening 165 applies sand 30 from the front right tire delivery tube 55 to the front right tire 60, a rear left slotted application opening (not shown in this FIG.) applies sand 30 from the rear left tire delivery tube 70 (not shown in this FIG.) to the rear left tire 75 (not shown in this FIG.), and a rear right slotted application opening (not shown in this FIG.) applies sand 30 from the rear right tire delivery tube 85 (not shown in this FIG.) to a rear right tire 90 (not shown in this FIG.).

Figure 3:
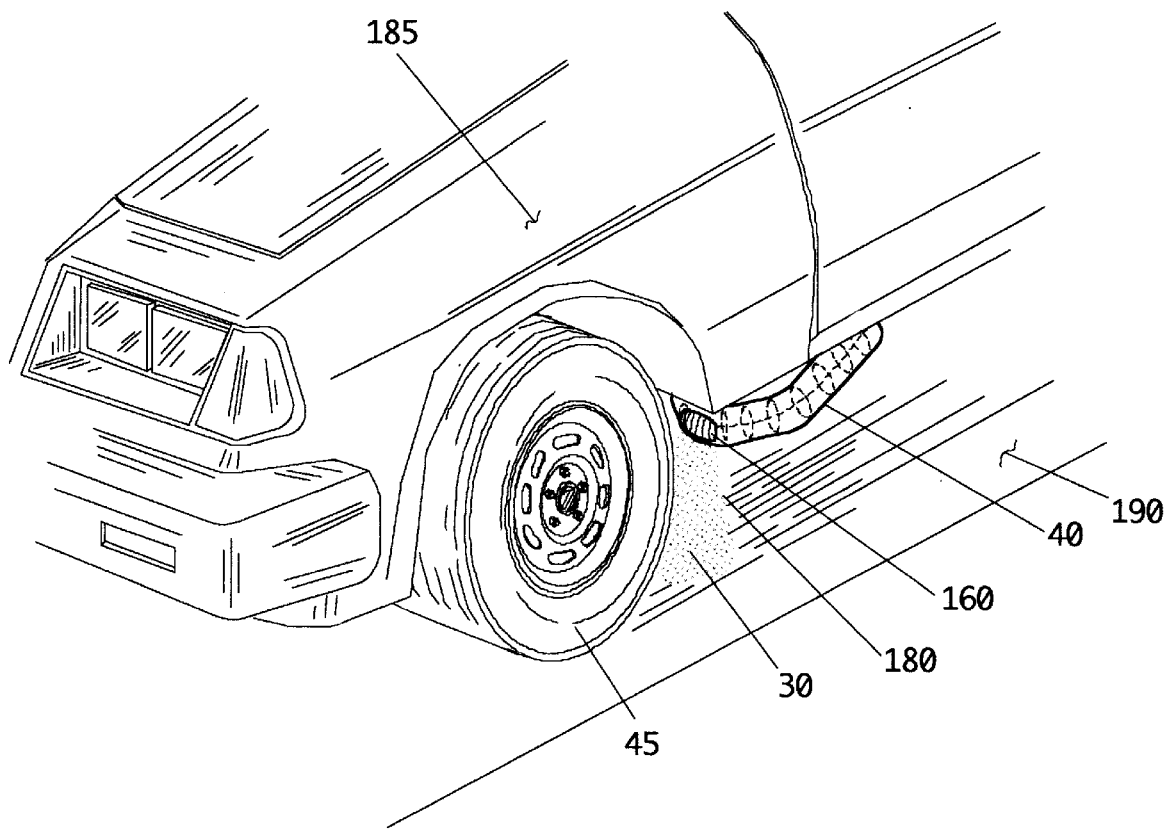
FIG. 3 is a perspective view of the delivery pipe dispensing sand at a wheel of a typical motor vehicle.

Referring now to FIG. 3, a perspective view of the front left tire delivery tube 40 as seen applying sand 30 to a front left tire 45 is shown. The slotted design of the front left slotted application opening 160 provides for a fan shaped distribution pattern 180 of sand 30 to cover the entire tread pattern of the front left tire 45. When the front left tire 45 is driving a conventional motor vehicle 185 in a reverse direction, it is envisioned that the front left tire 45 will carry the sand 30 behind the front left tire 45 to a pavement surface 190 to aid in rearward traction behind the conventional motor vehicle 185.

Figure 4:
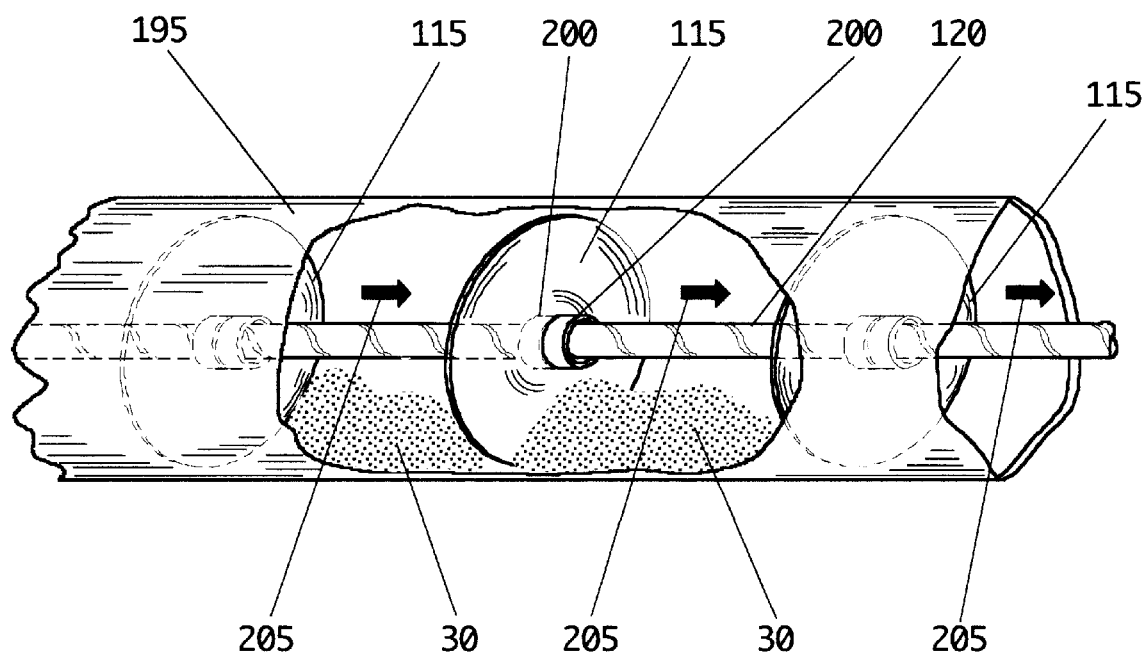
FIG. 4 is a detailed cutaway perspective view of the delivery pipe interior and associated delivery system.

Referring finally to FIG. 4, a cutaway perspective view of a typical delivery tube 195 is depicted. The typical delivery tube 195 is typical for the front left tire delivery tube 40, the front right tire delivery tube 55, the rear left tire delivery tube 70, and the rear right tire delivery tube 85. The connecting cable 120 is fastened to the movable discs 115 by a pair of attachment clips 200 located at the center of the movable discs 115. The attachment clips 200 also aids in the axial stability of the movable discs 115 as it passes through the typical delivery tube 195 to prevent side-to-side twisting. The sand 30 is divided into separate slugs, separated and mobilized by the movable discs 115 as it moves through the typical delivery tube 195 as shown by a travel path 205 in a continuous loop basis as aforementioned described.

2. Operation of the Preferred Embodiment

In operation, the present invention can be easily utilized by the common user in a simple and effortless manner. To use the present invention with its preferred embodiment can best be described in conjunction with the perspective views of FIG. 1 and FIG. 1a, and the sectional views of FIG. 2 and FIG. 3.

The user would first begin by the installation of the universal, sand dispersion apparatus for motor vehicles 10. It is envisioned that the universal, sand dispersion apparatus for motor vehicles 10 would be provided as a factory furnished option on new motor vehicles, however aftermarket modification kits for specifically designed vehicles would also be available. After installation in a manner generally arranged in a manner as that shown in FIG. 1, the universal, sand dispersion apparatus for motor vehicles 10 would be ready for utilization.

While driving under wintertime driving conditions, and the motor vehicle becomes immobilized due to traction loss under icy or snowy conditions, the user would verify an adequate supply of sand 30 inside the sand reservoir 20. If an adequate supply is not present, the user would place bulk sand or prepackaged sand into the sand reservoir 20. Depending on which wheels are in need of traction, the user would place the first operating lever 35 into the right position 150 or the left position 155 as needed and return the first operating lever 35 to the off position 145 for the front wheels. Or the user would place the second operating lever 36 into the right position 150 or the left position 15 as needed and return the second operating lever 36 to the off position 145 for the rear wheels. Or in the case of four-wheel drive vehicles, the user could alternate the position of the first operating lever 35 from the right position 150 to the left position 155 and the second operating lever 36 from the right position 150 to the left position 155 directly in an alternating basis. This action will dispense sand 30 to the front left tire 45 and the front right tire 60 with the first operating lever 35 and to the rear left tire 75 and the rear right tire 90 with the second operating lever 36. With the improvement in traction as afforded by the sand 30 it is envisioned that the motor vehicle will gain traction and continue on its intended travel.

The foregoing description is included to illustrate the operation of the preferred embodiment and is not meant to limit the scope of the invention. The scope of the invention is to be limited only by the following claims.

What is claimed is:

1. A universal, sand dispersion apparatus for motor vehicles, said apparatus comprising:

a sand reservoir, said sand reservoir adapted to be arranged substantially centrally in the passenger compartment area of a motor vehicle frame, said sand reservoir consisting of a first sand compartment, a second sand compartment, a third sand compartment, and a fourth sand compartment;

a sand distribution plenum located directly beneath said sand reservoir and in fluid communication therewith;

a first operating lever;

a second operating lever;

a front left tire delivery tube in fluid communication with said reservoir and functioning to route sand to a front left tire and provides a return path via a front left tire return tube;

a front right tire delivery tube in fluid communication with said reservoir and functioning to route sand to a front right tire and provides a return path via a front right tire return tube;

a rear left tire delivery tube in fluid communication with said reservoir and functioning to route sand to a rear left tire and provides a return path via a rear left tire return tube;

a rear right tire delivery tube in fluid communication with said reservoir, and functioning to route the sand to a rear right tire and provides a return path via a rear right tire return tube;

a plurality of moveable discs located inside each said delivery tube and return tube, each connected by a separate connecting cable;

sand advancing means having a first ratcheting means and a second ratcheting means, said first ratcheting means and said second ratcheting means capable of grabbing said connecting cable and advancing the series of movable discs through the sand in a segment length as defined by a space interval between the movable discs, the position of said sand advancing means being governed by said first operating lever such that when said first operating lever is located in an off position, both said first ratcheting means and the second ratcheting means are in a neutral position, and thus no movement of the movable discs occurs.

2. The universal, sand dispersion apparatus for motor vehicles of claim 1, further comprising:

a front left slotted application opening located at a transition from the front left tire delivery tube to the front left tire return tube such that sand located inside the front left tire delivery tube will exit the front left tire delivery tube through the front left slotted application opening when the nearest movable discs to the front left slotted application opening passes over.

3. The universal, sand dispersion apparatus for motor vehicles of claim 1, further comprising:

a front right slotted application opening located at a transition from the front right tire delivery tube to the front right tire return tube such that sand located inside the front right tire delivery tube will exit the front right tire delivery tube through the front right slotted application opening when the nearest movable discs to the front right slotted application opening passes over.

4. The universal, sand dispersion apparatus for motor vehicles of claim 1, further comprising:

a rear left slotted application opening located at a transition from the rear left tire delivery tube to the rear left tire return tube such that sand located inside the rear left tire delivery tube will exit the rear left tire delivery tube through the rear left slotted application opening when the nearest movable discs to the rear left slotted application opening passes over.

5. The universal, sand dispersion apparatus for motor vehicles of claim 1, further comprising:

a rear right slotted application opening located at a transition from the rear right tire delivery tube to the rear right tire return tube such that sand located inside the rear right tire delivery tube will exit the rear right tire delivery tube through the rear right slotted application opening when the nearest movable discs to the rear right slotted application opening passes over.

6. The universal, sand dispersion apparatus for motor vehicles of claim 1, wherein an opening to the sand reservoir, said first operating lever, and said second operating lever are adapted to be located so as to be readily accessible to a driver's position within the motor vehicle.

7. The universal, sand dispersion apparatus for motor vehicles of claim 1, wherein said connecting cable is fastened to said movable discs by a pair of attachment clips located at the center of the movable discs such that said attachment clips also aid in the axial stability of said movable discs as they pass through said delivery tubes to prevent side-to-side twisting.

* * * * *